United States Patent [19]

Sakai et al.

[11] Patent Number: 5,549,785
[45] Date of Patent: Aug. 27, 1996

[54] METHOD OF PRODUCING A SEMICONDUCTOR DYNAMIC SENSOR

[75] Inventors: Minekazu Sakai; Tsuyoshi Fukada, both of Aichi; Masakazu Terada, Kariya; Shinsuke Watanabe, Aichi; Minoru Nishida, Okazaki, all of Japan

[73] Assignee: Nippondenso Co., Ltd., Kariya, Japan

[21] Appl. No.: 120,380

[22] Filed: Sep. 14, 1993

[30] Foreign Application Priority Data

Sep. 14, 1992 [JP] Japan .................................. 4-244448
Sep. 21, 1992 [JP] Japan .................................. 4-251677

[51] Int. Cl.$^6$ ................................................ B23P 15/00
[52] U.S. Cl. ................. 156/644.1; 437/228; 437/921; 148/DIG. 159; 156/650.1; 156/657.1; 156/661.11
[58] Field of Search ................ 156/644.1, 646.1, 156/657.1, 659.11, 661.11, 662.1, 650.1; 437/67, 909, 927, 228 SEN, 921; 257/254, 415; 148/DIG. 159

[56] References Cited

U.S. PATENT DOCUMENTS

| | | | |
|---|---|---|---|
| 4,706,374 | 11/1987 | Murakami | 437/921 |
| 4,853,669 | 8/1989 | Guckel et al. | 338/4 |
| 4,889,590 | 12/1989 | Tucker et al. | 156/647 |
| 4,967,597 | 11/1990 | Yamada et al. | |
| 4,968,336 | 11/1990 | Reimanis et al. | 55/227 |
| 4,975,390 | 12/1990 | Fujii et al. | 437/228 SEN |
| 5,034,342 | 7/1991 | Sidner et al. | 437/67 |
| 5,115,292 | 5/1992 | Takebe et al. | 357/26 |
| 5,264,075 | 11/1993 | Zanini-Fisher et al. | 437/228 SEN |
| 5,279,162 | 1/1994 | Takebe et al. | 73/726 |
| 5,285,097 | 2/1994 | Hirai et al. | 257/417 |
| 5,294,760 | 3/1994 | Bower et al. | 200/83 N |
| 5,324,688 | 6/1994 | Kondo | 437/228 SEN |

FOREIGN PATENT DOCUMENTS

| | | |
|---|---|---|
| 51-134086 | 11/1976 | Japan . |
| 8204900 | 11/1983 | Japan . |
| 360214533 | 10/1985 | Japan .................................. 156/644.1 |
| 0253279 | 12/1985 | Japan .................................. 437/921 |
| 63-076483 | 4/1988 | Japan . |
| 0173679 | 3/1989 | Japan . |
| 1222489 | 9/1989 | Japan . |
| 02218172 | 8/1990 | Japan . |
| 02231571 | 9/1990 | Japan . |
| 03049267 | 3/1991 | Japan . |
| 3266473 | 11/1991 | Japan . |
| 0476958 | 3/1992 | Japan . |
| 514247 | 6/1993 | Japan . |
| 5251714 | 9/1993 | Japan . |
| 406104452 | 4/1994 | Japan .................................. 437/921 |

OTHER PUBLICATIONS

Lynn M. Roylance et al, "A Batch–Fabricatead Silicon Accelerometer", IEEE Transactions on Electron Devices, vol. ED26, No. 12, Dec. 1979, pp. 1911–1917.

M. Bao et al, "A Micromechanical Structure Eliminating Latearal Effect of Siicon Accelerometer", 1991 IEEE=IEEE 1991, pp. 101–103.

Primary Examiner—George Fourson
Assistant Examiner—Long Pham
Attorney, Agent, or Firm—Cushman, Darby & Cushman

[57] ABSTRACT

A method of producing a semiconductor dynamic sensor which features an improved sensitivity yet having a small size while avoiding damage to the thin distortion-producing portion. A resist film 49 is photo-patterned on the front main surface of the semiconductor substrate 41 except for the region where the upper isolation grooves are to be formed prior to forming the lower isolation groove 10 by the first etching of the back main surface of the semiconductor substrate 41 (which includes the epitaxial layer 42). Unlike the prior art, therefore, there is no need to spin-coat the front main surface of the semiconductor substrate 41 with the resist film 49 which is followed by photo-patterning after a predetermined region of the semiconductor substrate 41 has been reduced in thickness by the first etching. Therefore, damage therefore to the thin portion by the vacuum chucking the wafer during the spin-coating of the resist film is avoided.

14 Claims, 16 Drawing Sheets

BEAM

BEAM

METHOD OF PRODUCING A SEMICONDUCTOR DYNAMIC SENSOR

BACKGROUND OF THE INVENTION

1. Field of the Invention

The present invention relates to a method of producing a semiconductor acceleration sensor or a semiconductor pressure sensor (hereinafter referred to as semiconductor dynamic sensor).

2. Description of the Related Art

A conventional method of producing a semiconductor dynamic sensor is illustrated in FIGS. 9 to 13.

Referring, first, to FIG. 9, a wafer 40 having an n-type epitaxial layer 42 is formed on a p-type substrate 41, a $p^+$-type diffusion layer 43 which is a piezo-resistance region is formed therein, and an $n^+$-type diffusion layer 44 is formed so as to be used as an electrode contact during the electrochemical etching. Then, a plasma nitride film (P-SiN) 45 is formed on the back surface of the wafer 40 and is patterned as desired by photo-etching.

Referring next to FIG. 10, the wafer 40 whose surface is protected with wax W is adhered to an alumina support substrate 46, and is dipped in an etching solution. An electric current is supplied to the $n^+$-type diffusion layer to effect the electrochemical etching in order to form lower isolation grooves 10 in the p-type substrate 41.

Then, with reference to FIG. 11, the nitride film 45 is removed, a resist 49 is applied onto the surface of the wafer 40 and is photo-patterned and, then, a resist 50 is applied onto the whole back surface of the wafer 40.

Then, as shown in FIG. 12, the epitaxial layer 42 is removed by etching through the opening of the resist film 49 thereby to form upper isolation grooves 51.

As shown in FIG. 13, next, the resists 49 and 50 are peeled off, and the wafer is cut.

In recent years, it has been urged to provide sensors having improved sensitivity in reduced sizes, and this can be effectively accomplished by reducing the thickness of a thin distortion-producing portion 52 where a piezo-resistance region 43 will be formed.

According to the above-mentioned method of producing a semiconductor dynamic sensor, however, the central portion of the wafer 40 must be vacuum-chucked onto a spinning table in order to spin-coat the surface of the epitaxial layer 42 with the resist 49 in FIG. 12 after the thickness of the epitaxial layer 42 has been partly reduced by etching the substrate 41 in FIG. 10. As the thickness of the epitaxial layer 42 is decreased, therefore, the thin portion of the epitaxial layer 42 tends to be broken by the vacuum pressure. According to the conventional production method, therefore, the thin distortion-producing portion 52 must have a minimum thickness (e.g., about several tens of microns) which withstands the vacuum chucking in the step of coating resist for photo-patterning after the substrate 41 has been etched. That is, it was not allowed to further improve the sensitivity by further decreasing the thickness of the thin distortion-producing portion 52.

As one application, the above-mentioned semiconductor dynamic sensor can be used as an acceleration sensor for automobiles. Acceleration sensors for automotive applications have been employing a semiconductor acceleration sensor made up of a piezo-resistance element (e.g., that disclosed in Japanese Unexamined Patent Publication (Kokai) No. 2-231571). That is, a silicon chip is joined onto the seat, a moving portion of a beam structure is formed in a portion of the silicon chip, and a piezo-resistance layer is formed in the moving portion which has a thickness of about 40 μm.

In this acceleration sensor, a thin beam is formed by subjecting the back surface of the silicon substrate to the etching with KOH until the thickness is decreased to a desired value. Then, by masking the beam portion, the front surface is subjected to the wet etching using a solution of the type of hydrofluoric acid and nitric acid (HF:HNO3:CH3COOH=1:2 to 8:0 to 8) in order to form a through hole and a beam structure.

However, when it is attempted to improve sensitivity of a general semiconductor acceleration sensor to sense small accelerations (0 to 1.5 G) so that it can be used as an acceleration sensor for ABS use, it becomes necessary to decrease the thickness of the thin portion (moving portion) of the silicon chip to be smaller than about 15 μm. When the thin portion has a thickness which is as large as about 30 to 50 μm, no problem arises even when the wet etching is effected with the solution of hydrofluoric acid and nitric acid to form a through hole and a beam structure since the thickness is sufficiently great. When the beam has a thickness of as small as 3 to 5 μm, however, formation of the through hole by the wet etching with the solution of hydrofluoric acid and nitric acid makes it difficult to obtain strength to a sufficient degree.

SUMMARY OF THE INVENTION

The present invention was accomplished in view of the above-mentioned problem, and its object is to provide a method of producing a semiconductor dynamic sensor which features an improved sensitivity yet having a small size while avoiding damage to the thin distortion-producing portion.

The above-mentioned object of the present invention is accomplished by a method of producing a semiconductor dynamic sensor comprising:

a photo-patterning step for coating the front main surface of a semiconductor substrate with a resist film except the surface of a region where upper isolation grooves are to be formed;

a first etching step for forming a lower isolation groove under the region where the upper isolation grooves are to be formed and under a region where thin distortion-producing portions are to be formed by etching a predetermined region on the back main surface of the semiconductor substrate to a predetermined depth; and a second etching step for forming the upper isolation grooves that communicate with the lower isolation groove by etching the front main surface of the semiconductor substrate starting from the opening of the resist film, in order to sectionalize the thin distortion-producing portions in the region where the thin distortion-producing portions are to be formed by utilizing the isolation grooves.

According to the method of producing a semiconductor dynamic sensor of the present invention as described above, the resist film is photo-patterned on the front main surface of the semiconductor substrate except the region where the upper isolation grooves are to be formed prior to forming the lower isolation groove under the region where the upper isolation grooves are to be formed and under the region where the thin distortion-producing portions are to be formed by the first etching of the back main surface of the semiconductor substrate. Unlike the prior art, therefore, there is no need to spin-coat the front main surface of the semiconductor substrate with the resist film followed by photo-patterning after the region where the upper isolation grooves are to be formed and the region where the thin distortion-producing portions are to be formed have been reduced in thickness by the first etching.

Damage to the thinned region where the upper isolation grooves are to be formed and the thinned region where the thin distortion-producing portions are to be formed by the vacuum chucking of the wafer during the spin-coating of the resist film is therefore.

As a result, the thin distortion-producing portions can be further reduced in thickness (e.g., several μm), and a sensor can be realized having further improved sensitivity yet enabling the sizes of each of the portions to be decreased.

DETAILED DESCRIPTION OF THE PREFERRED EMBODIMENTS

An embodiment of the semiconductor acceleration sensor to which the present invention is adapted will now be described with reference to the drawings.

Figure 1:
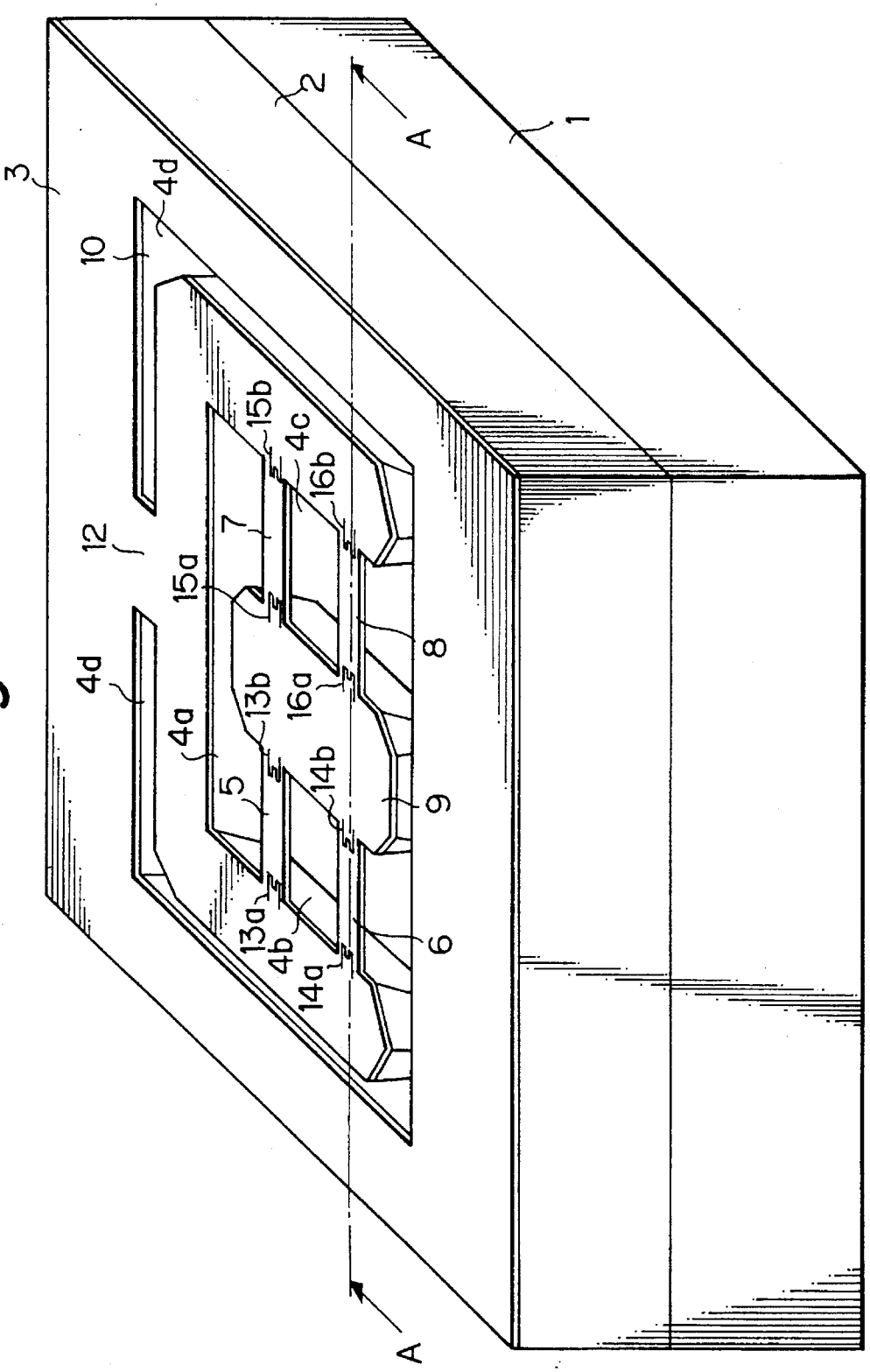
FIG. 1 is a perspective view of a semiconductor acceleration sensor according to an embodiment of the invention.
Figure 2:
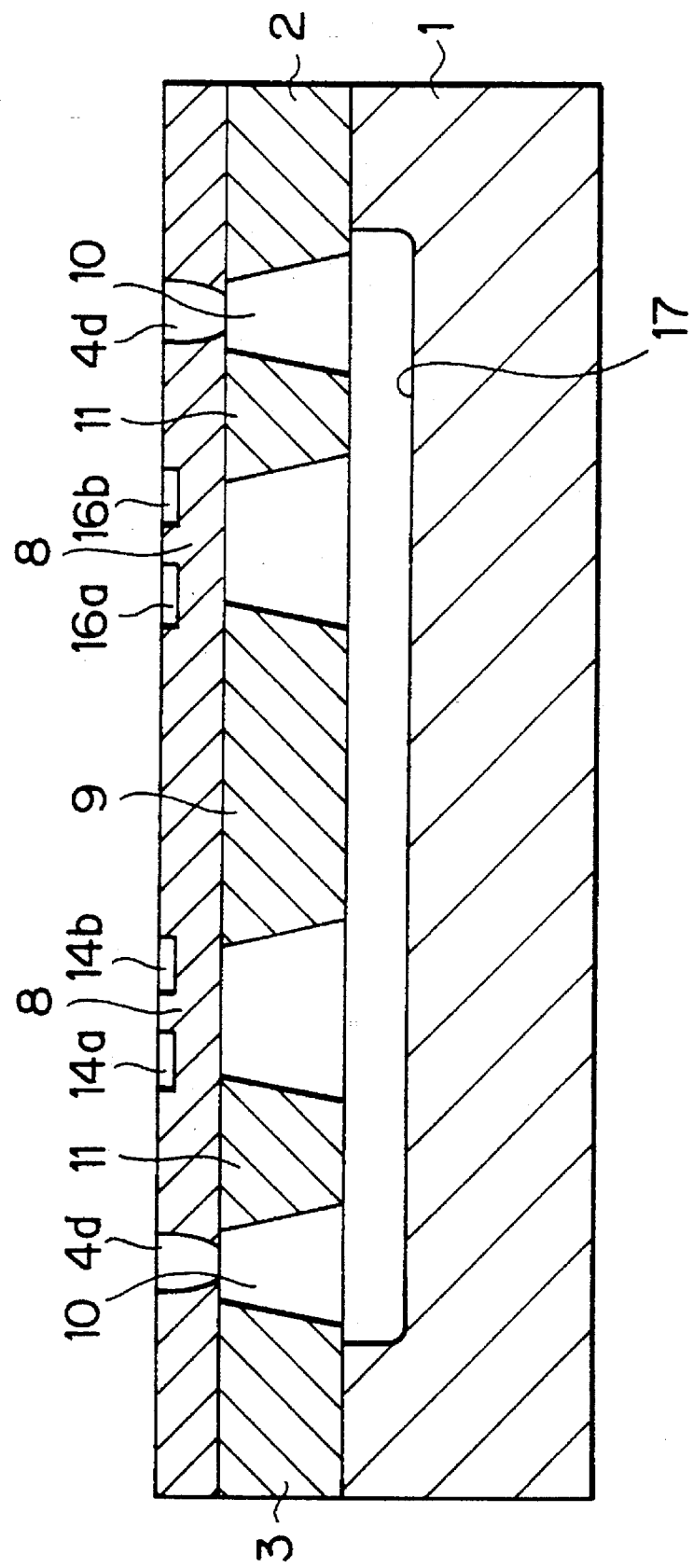
FIG. 2 is a sectional view along the line A—A of FIG. 1.

FIG. 1 is a perspective view of the semiconductor acceleration sensor, and FIG. 2 is a sectional view along the line A—A of FIG. 1. This sensor is used for an ABS system of automobiles.

A silicon chip 2 of the shape of a square plate is joined onto a seat 1 of the shape of a square plate made of Pyrex glass. The silicon chip 2 has a first support portion 3 of the shape of a square frame of which the back main surface is joined to the seat 1, the first support portion 3 being formed by utilizing four sides of the silicon chip 2. In the inside of the first support portion 3 of the silicon chip 2 are formed upper isolation grooves 4a, 4b, 4c, 4d and a lower isolation groove 10 in a recessed manner, the upper isolation grooves 4a, 4b, 4c, 4d and the lower isolation groove 10 being communicated with each other to form a through groove that penetrates through the chip 2.

A thick U-shaped second support portion 11 and a thick coupling portion 12 are sectionalized by the C-shaped upper isolation groove 4d formed in the square frame-like first support portion 3 and by the lower isolation groove 10 under the upper isolation groove 4d, the second support portion 11 being coupled to the first support portion 3 by the coupling portion 12. Thin distortion-producing portions 5, 6, 7 and 8 extend from the inside surface of the second support portion 11, and a thick square weight 9 is coupled to the ends of the thick distortion-producing portions 5, 6, 7 and 8.

That is, the second support portion 11 is coupled, via the coupling portion 12, to the thick first support portion 3 that is joined to the seat 1, and the weight 9 is supported at both its ends by the second support portion 11 via thin distortion-producing portions 5, and 6, 7 and 8. The lower isolation groove 10 is formed under the upper isolation grooves 4a, 4b, 4c, 4d and under the thin distortion-producing portions 5 to 8, the upper isolation grooves 4a, 4b, 4c, and 4d being communicated with the lower isolation groove 10 to constitute a through groove that penetrates through the chip 2.

The thin distortion-producing portions 5 to 8 have thicknesses of about 4 μm and, respectively, have on the surfaces thereof two piezo-resistance regions 13a, 13b, 14a, 14b, 15a, 15b, 16a and 16b. As illustrated in FIG. 2, furthermore, a recessed portion 17 is formed at a central portion in the upper surface of the seat 1 to avoid contact when the weight 9 is displaced due to acceleration.

Figure 17:
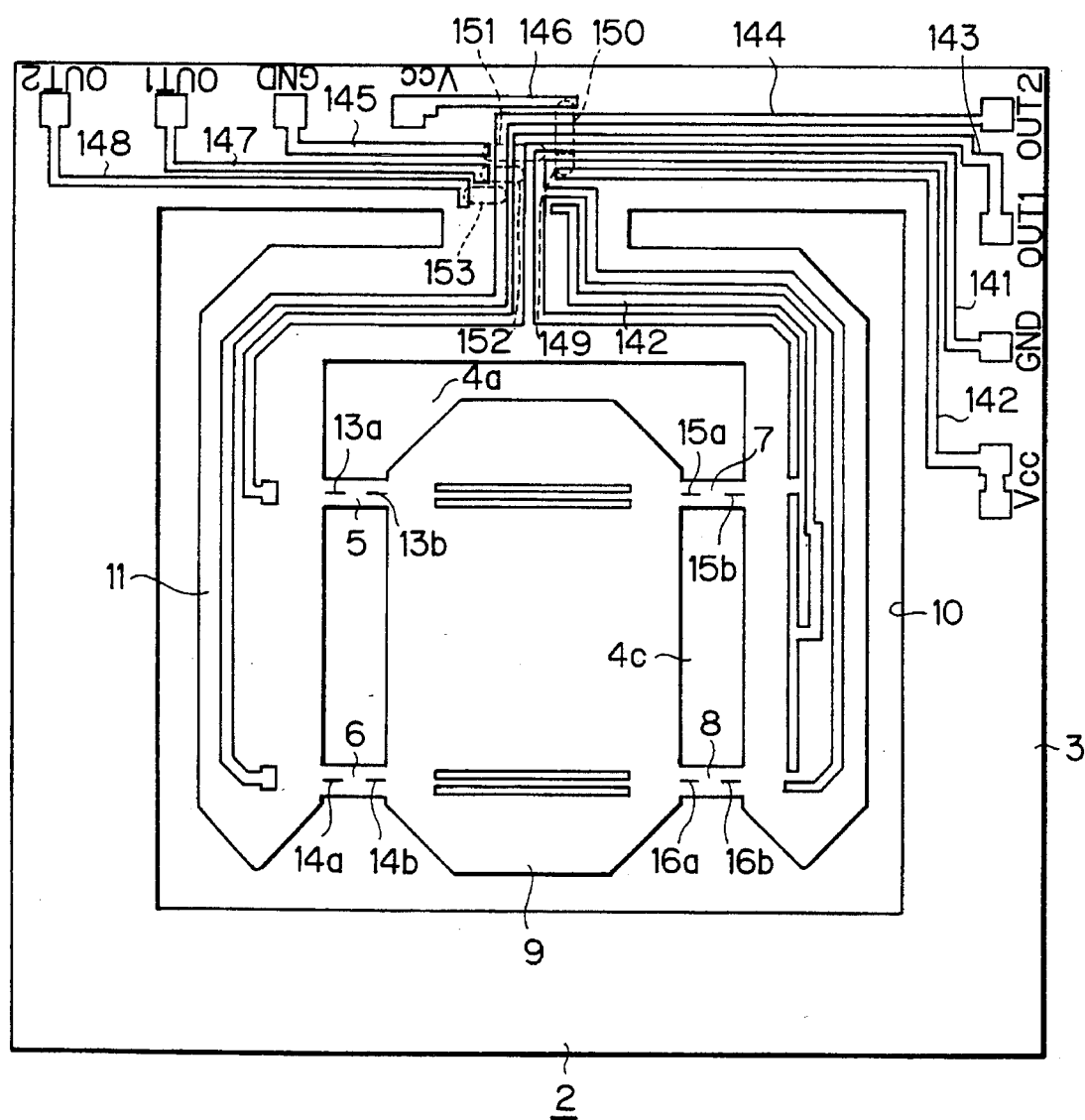
FIG. 17 is a plan view of the silicon chip illustrating a wiring pattern.

On the surface of the silicon chip 2 is formed an aluminum wiring pattern. An example thereof is shown in FIG. 17 which is a diagram which concretely illustrates an aluminum wiring pattern that is arranged on the surface of a silicon chip 60 which corresponds to the silicon chip 2. In this embodiment, there are formed a wiring 141 for grounding, a wiring 142 for applying a power source voltage, and wirings 143 and 144 for outputting a potential difference which corresponds to the acceleration. Another set of four wirings are prepared which correspond to these wirings. That is, there are formed a wiring 145 for grounding, a wiring 146 for applying the power source voltage, and wirings 147 and 148 for outputting a potential difference that corresponds to the acceleration. An impurity diffusion layer 149 of the silicon chip 60 exists in such a way that the wiring 142 for applying the power source voltage, and the wiring 141 for grounding intersect over the impurity diffusion layer 149 via a silicon oxide film. The wiring 146 for applying the power source voltage is connected to the wiring 142 for applying the power source voltage via an impurity diffusion layer 150, the wiring 145 for grounding is connected to the wiring 141 for grounding via an impurity diffusion layer 151, and the wiring 147 for output is connected to the wiring 143 for output via an impurity diffusion layer 152. The wirings 148 and 144 for output are connected together via an impurity diffusion layer 153 which adjusts resistance. In this embodiment, the connection is accomplished by using the wirings 141 to 144.

Figure 3:
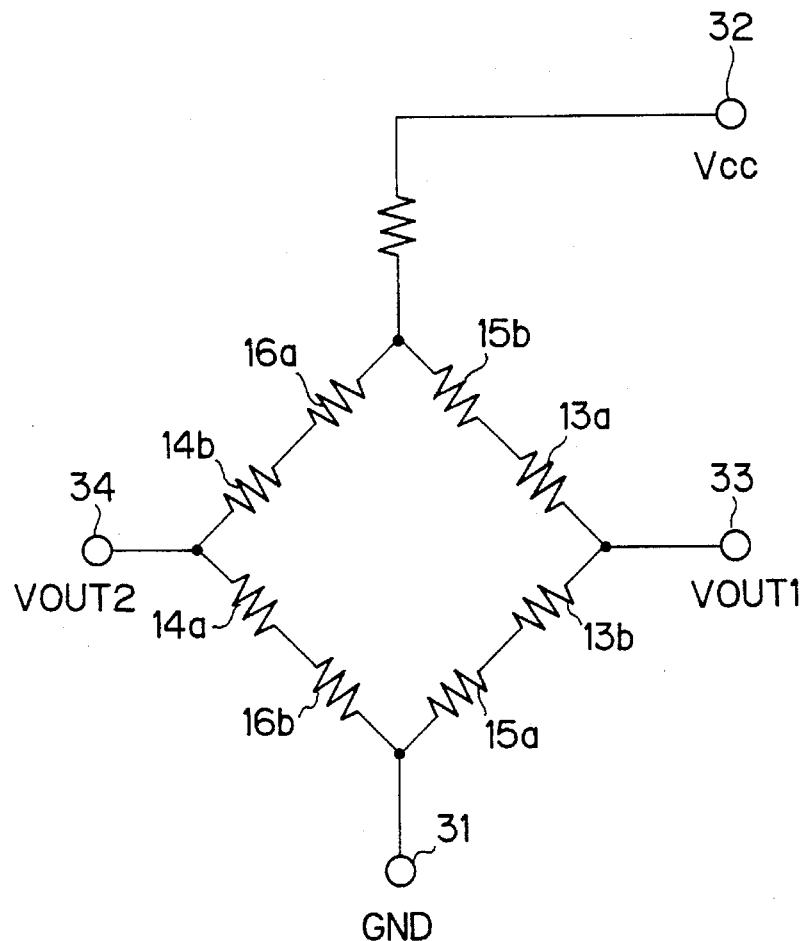
FIG. 3 is a diagram illustrating a bridge circuit of the sensor.

In the aforementioned semiconductor dynamic sensor of the present invention, the piezo-resistance regions 13a, 13b, 14a, 14b, 15a, 15b, 16a and 16b constitute a Whetstone bridge circuit as shown in FIG. 3, and a terminal 31 is for grounding, a terminal 32 is for applying the power source voltage, and terminals 33 and 34 are for outputting a potential difference which corresponds to the acceleration.

A method of producing the sensor will now be described with reference to FIGS. 4 to 8 which are sectional views along the line A—A of FIG. 1.

Figure 4:
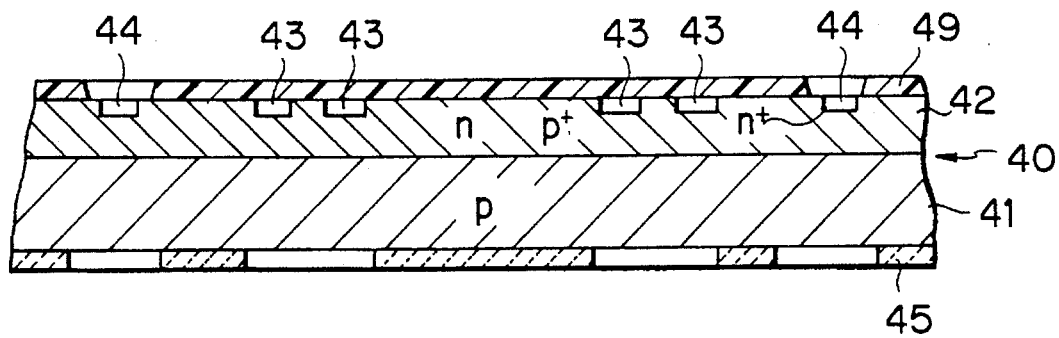
FIG. 4 is a sectional view illustrating a step of producing the sensor of FIG. 1.

First, as shown in FIG. 4, a wafer 40 having an n-type epitaxial layer (semiconductor substrate as referred to in the invention) 42 is prepared on a p-type substrate (semiconductor substrate as referred to in the invention) 41 having a surface azimuth (100). Then, $p^+$-type diffusion layers 43 are formed as piezo-resistance regions 13a, 13b, 14a, 14b, 15a, 15b, 16a and 16b, and $n^+$-type diffusion layers 44 are formed as electrode contacts during the electrochemical etching in the surface of a region where the upper isolation grooves 4a, 4b, 4c and 4d are to be formed by etching. Thereafter, a silicon oxide film (not shown) formed on the epitaxial layer 42 is selectively opened, and aluminum wirings 141 to 148 are formed thereon as shown in FIG. 17 and are brought into contact with predetermined positions of the p-type diffusion layer 43. Then, a passivation insulating film (not shown) composed of a silicon oxide film is deposited and is selectively opened to form contact holes for bonding wires. In a series of these processes, an aluminum film is deposited on the $n^+$-type diffusion layer 44, and the passivation insulating film is opened to form a current-carrying aluminum contact portion (not shown) that comes into contact with the $n^+$-type diffusion layer 44.

Then, on the back surface of the wafer 40, i.e., on the surface (back main surface as referred to in the invention) of the substrate 41 is formed a plasma nitride film (P-SiN) 45 except for the region where the lower isolation groove 10 is to be formed by etching, and the plasma nitride film 45 is photo-patterned by using a resist film that is not shown.

Next, the front main surface of the wafer 40, i.e., the surface of the epitaxial layer 42 that serves as a region where the upper isolation grooves 4a, 4b, 4c, and 4d are to be formed by etching, is spin-coated with a resist film (resist film as referred to in the invention) 49 which is then photo-patterned. Here, the silicon oxide film and the passivation insulating film have been removed from the region where the upper isolation grooves 4a, 4b, 4c and 4d are to be formed by etching, and the aforementioned current-carrying aluminum contact portion is exposed on the surface of the epitaxial layer 42 that is exposed by photo-patterning the resist film 49. The resist film 49 is a polyimide (PIQ) film having resistance against organic solvents that are used for removing wax.

Figure 5:
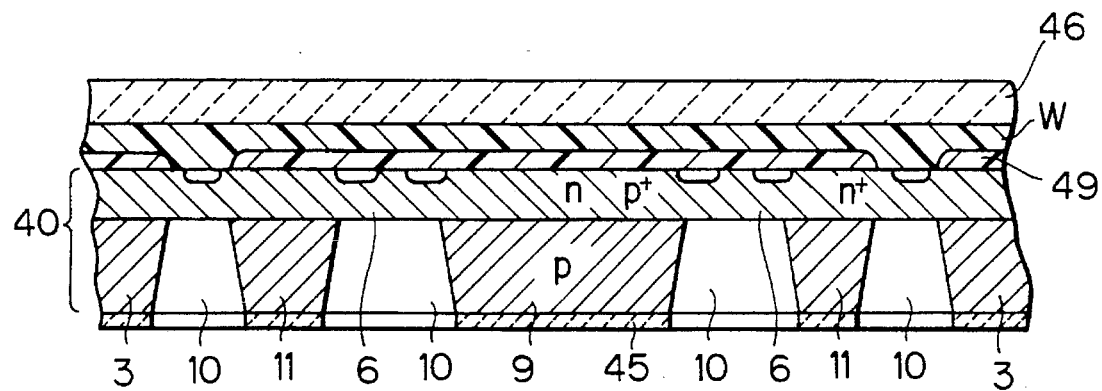
FIG. 5 is a sectional view illustrating a step of producing the sensor of FIG. 1.

Referring next to FIG. 5, the wafer 40 whose surface is protected with a resin wax W is adhered onto a support substrate 46 composed of aluminum and is immersed in an etching solution (e.g., a solution containing 33% by weight of KOH, 82° C.) to effect the electrochemical etching. The support substrate 46 is placed on a hot plate (200° C., not shown), the resin wax W is placed on the support substrate 46 and is softened and, then, the wafer 40 is placed thereon so as to be adhered. Thereafter, the support substrate 46 and the wafer 40 are removed from the hot plate to harden the wax. A platinum electrode that is not shown extends on the support substrate 46, and the tip of the platinum electrode is brought into contact with the aluminum contact portion to effect the electrochemical etching (anisotropic etching) by feeding a current to the epitaxial layer 42 and to the substrate 41 through the $n^+$-type diffusion layer 44, thereby to form the lower isolation groove 10 in the substrate 41. An electrode plate (not shown) is hung in the etching solution jar being faced to the wafer 40, a voltage of greater than 0.6 V is applied across the base end of the platinum electrode and the electrode plate with the platinum electrode as a positive electrode. As the etching proceeds to a portion where the substrate 41 and the epitaxial layer 42 are joined together, there is formed an anodically oxidized film (not shown), whereby the etching rate sharply decreases and the etching comes to a halt at the junction portion.

Figure 6:
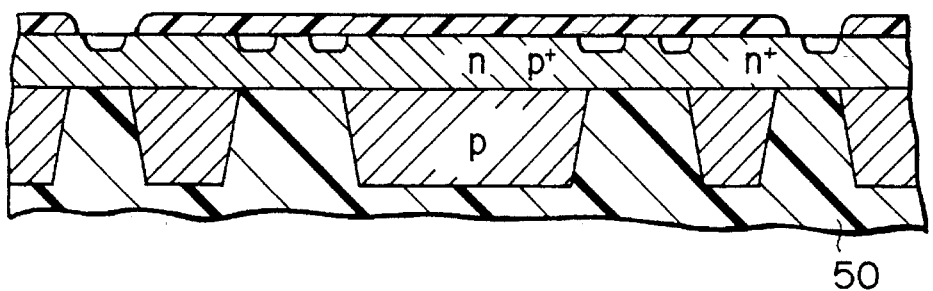
FIG. 6 is a sectional view illustrating a step of producing the sensor of FIG. 1.

Referring next to FIG. 6, the nitride film 45 is removed using hydrofluoric acid, and then the support substrate 46 is placed on the hot plate to soften the resin wax W. The wafer 40 is separated from the support substrate 46, and is immersed in an organic solvent (e.g., trichloromethane) to wash and dissolve the resin wax W. The wafer 40 is then taken out and the whole back main surface thereof is coated with a resist 50.

The resist 50 is not to be subjected to the photo-patterning but is formed to simply permit the resist solution to flow down. Unlike the case of the resist film (e.g., second resist film 49) that is photo-patterned, therefore, there is no need to vacuum-chuck the wafer 40 onto the spinning table of the spinning device.

Figure 7:
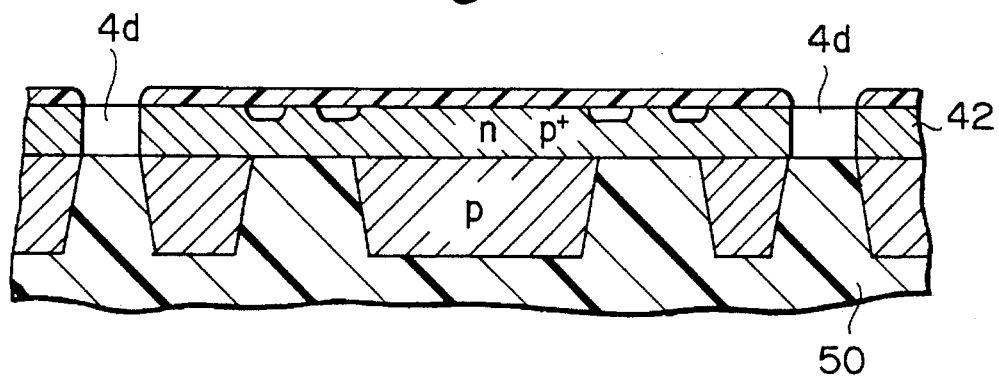
FIG. 7 is a sectional view illustrating a step of producing the sensor of FIG. 1.

Referring next to FIG. 7, the epitaxial layer 42 is dry-etched starting from the opening of the second resist film 49 to form the upper isolation grooves 4a, 4b, 4c and 4d.

Figure 8:
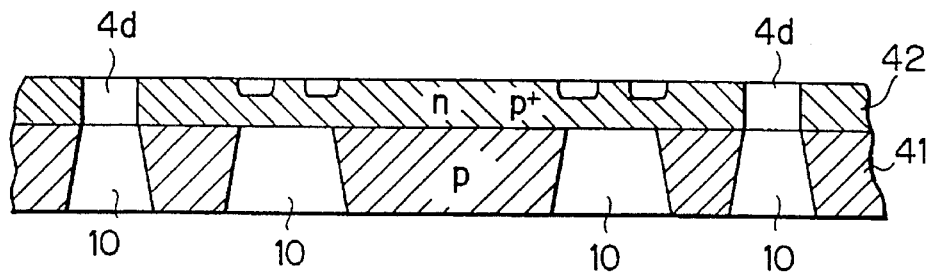
FIG. 8 is a sectional view illustrating a step of producing the sensor of FIG. 1.
Figure 9:
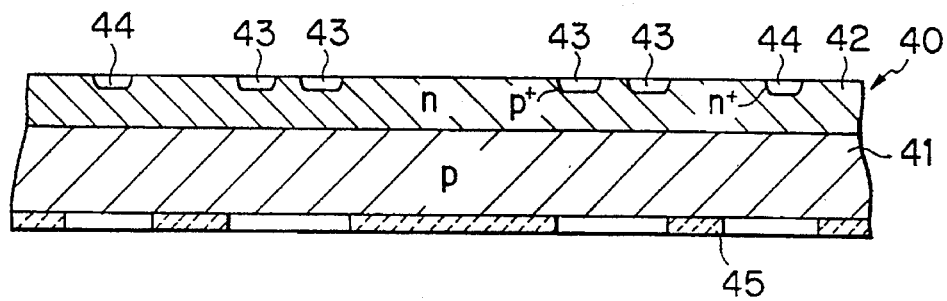
FIG. 9 is a sectional view illustrating a step of producing a conventional sensor.
Figure 10:
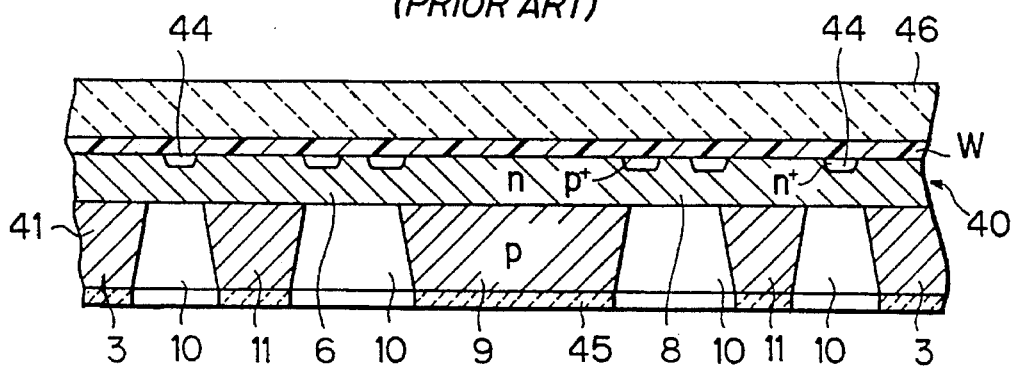
FIG. 10 is a sectional view illustrating a step of producing the conventional sensor.
Figure 11:
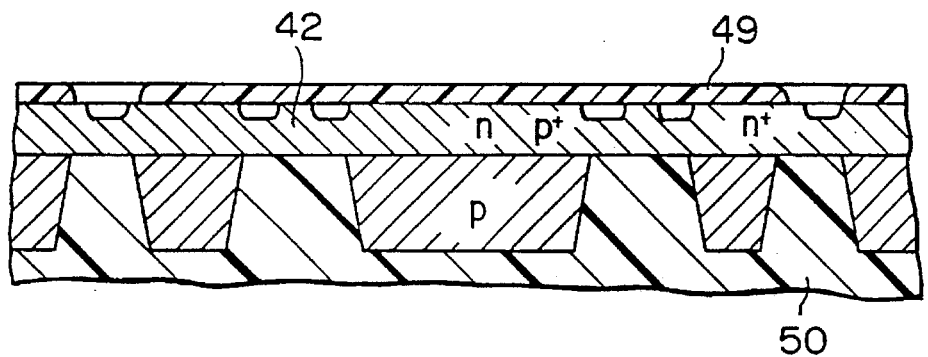
FIG. 11 is a sectional view illustrating a step of producing the conventional sensor.
Figure 12:
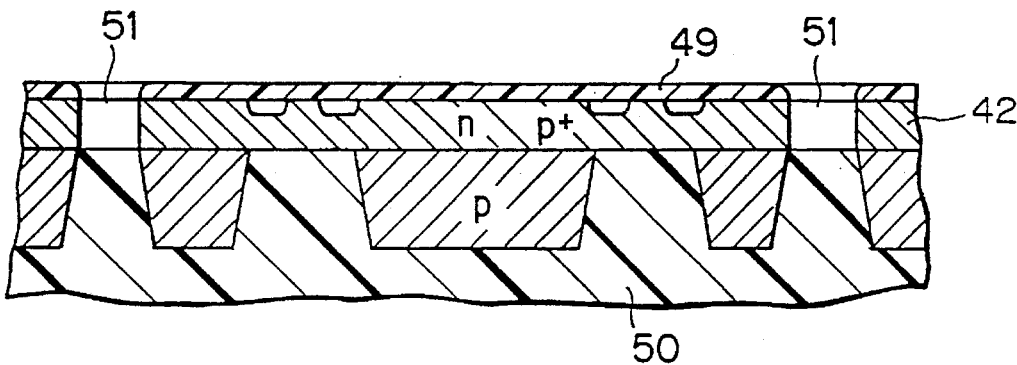
FIG. 12 is a sectional view illustrating a step of producing the conventional sensor.
Figure 13:
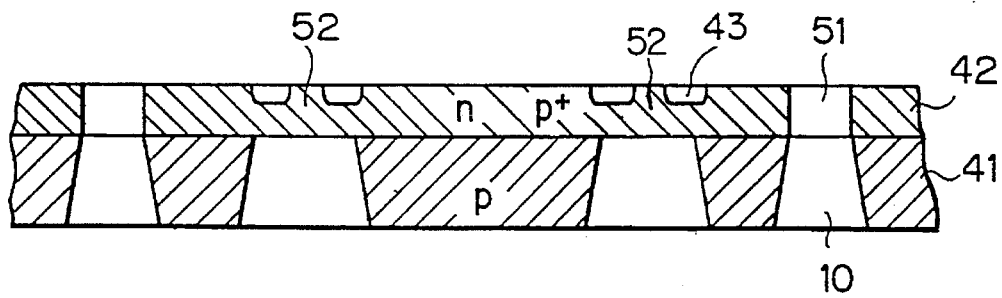
FIG. 13 is a sectional view illustrating a step of producing the conventional sensor.

Referring next to FIG. 8, the resist film 49 is removed by oxygen ashing, the resist 50 is removed using the organic solvent to complete the upper isolation grooves 4a, 4b, 4c and 4d which are communicated with the lower isolation groove 10 to form a through groove. The wafer 40 is then joined onto the seat 1 followed finally by dicing to obtain chips thereof.

According to the method of producing a semiconductor dynamic sensor of the embodiment as described above, the resist film 49 is photo-patterned on the front main surface of the wafer 40 except the region where the upper isolation grooves 4a, 4b, 4c and 4d are to be formed prior to forming the lower isolation groove 10 under the region where the upper isolation grooves 4a, 4b, 4c and 4d are to be formed and under the region where the thin distortion-producing portions 5 to 8 are to be formed by the first etching of the back main surface of the wafer (semiconductor substrate) 40. Unlike the prior art, therefore, there is no need to spin-coat the front main surface of the wafer 40 with the resist film 49 which is followed by photo-patterning after the region where the upper isolation grooves 4a, 4b, 4c and 4d are to be formed and the region where the thin distortion-producing portions 5 to 8 are to be formed have been reduced in thickness by the first etching.

Therefore, damage to the thinned region where the upper isolation grooves 4a, 4b, 4c and 4d are to be formed and the thinned region where the thin distortion-producing portions 5 to 8 are to be formed by the vacuum chucking of the wafer 40 during the spin-coating of the resist film 49 is avoided.

As a result, the thin distortion-producing portions 5 to 8 can be further reduced for their thicknesses (e.g., several μm), and a sensor can be realized having further improved sensitivity yet enabling the sizes of each of the portions to be decreased.

Moreover, the resist film 49 is composed of a polyimide film having resistance against the organic solvents (trichloromethane, trichloroethylene, etc.) that are used for removing wax W. Therefore, the resist film 49 that is photo-patterned is not damaged in a subsequent step of removing wax.

Figure 28:
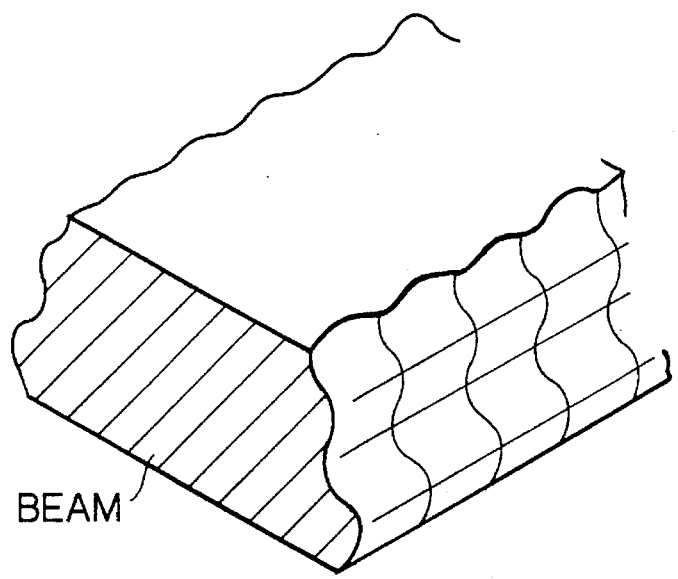
FIG. 28 is a perspective view of a beam according to a conventional method.

In the aforementioned embodiment of the present invention, the step of the second etching has employed dry etching because when a beam is constituted by forming a through hole in the step of the second etching which employs wet etching, the side surface of the beam is swollen as shown in FIG. 28 resulting in a decrease in the breaking strength.

The present invention therefore employs a method of producing a semiconductor distortion sensor comprising:

a first step for forming a piezo-resistance layer for detecting distortion on a predetermined region on the main surface of a single crystalline silicon substrate;

a second step for forming a thin portion having the piezo-resistance layer by removing a predetermined region of the single crystalline silicon substrate by anisotropic etching from the side of the back surface of the single crystalline silicon substrate; and a third step for forming a beam by removing part of the thin portion from the side of the front surface of the single crystalline silicon substrate by dry etching using a halogen-type gas.

Here, the halogen-type gas used in the third step should preferably be $CF_4$.

The above-mentioned first step corresponds to the step of photo-patterning of the embodiment, and the second step and the third step correspond, respectively, to the first etching step and to the second etching step of the embodiment.

Through the first step of the above-mentioned embodiment, a piezo-resistance layer for detecting distortion is formed on a predetermined region on the main front surface of the single crystalline silicon substrate. Through the second step, a predetermined region of the single crystalline silicon substrate is removed by anisotropic etching from the side of the back surface of the single crystalline silicon substrate, to thereby form a thin portion having piezo-resistance layer. Through the third step, furthermore, part of the thin portion is removed from the side of the main surface of the single crystalline silicon substrate by dry etching using the halogen-type gas.

Figure 27:
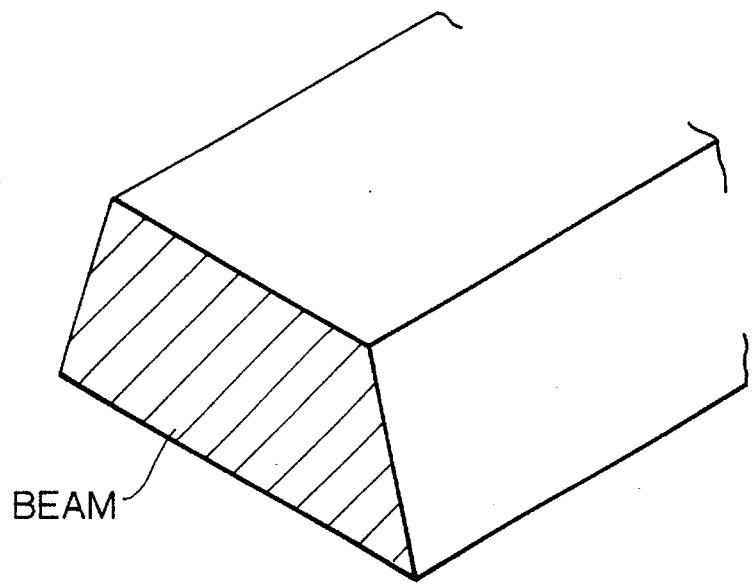
FIG. 27 is a perspective view of a beam according to the embodiment of the invention.

With the through hole being formed by dry etching with the halogen-type gas as described above, the beam structure exhibits flat side surfaces as shown in FIG. 27 which contribute to increasing the breaking strength. That is, a decrease in the strength is avoided that is caused by the swell of side surfaces of the beam which is brought about by the wet etching as shown in FIG. 28.

Described below in further detail is an embodiment for producing a semiconductor dynamic sensor by employing dry etching in the second etching step.

Figure 14:
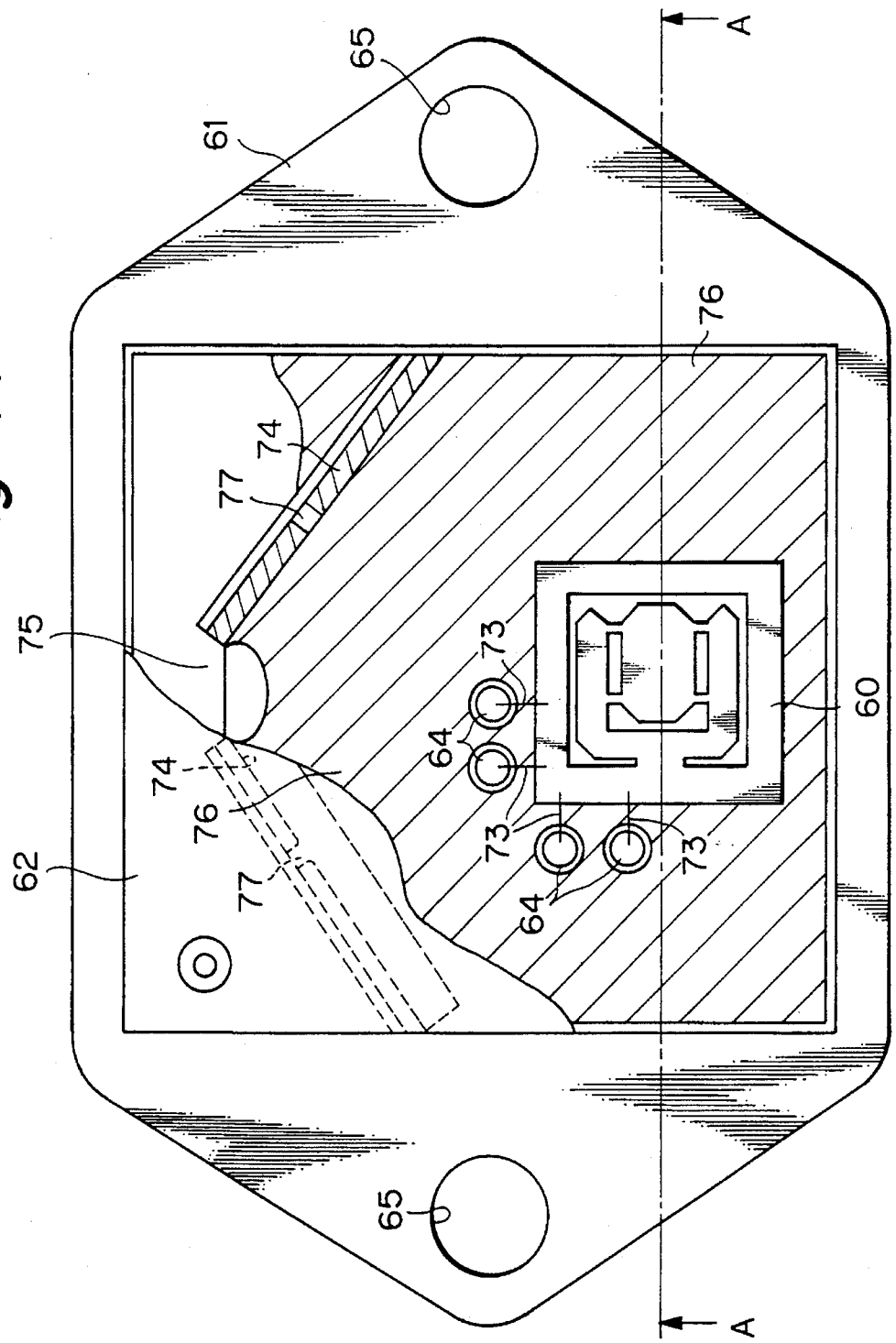
FIG. 14 is a plan view of a semiconductor acceleration sensor according to an embodiment of the present invention.
Figure 15:
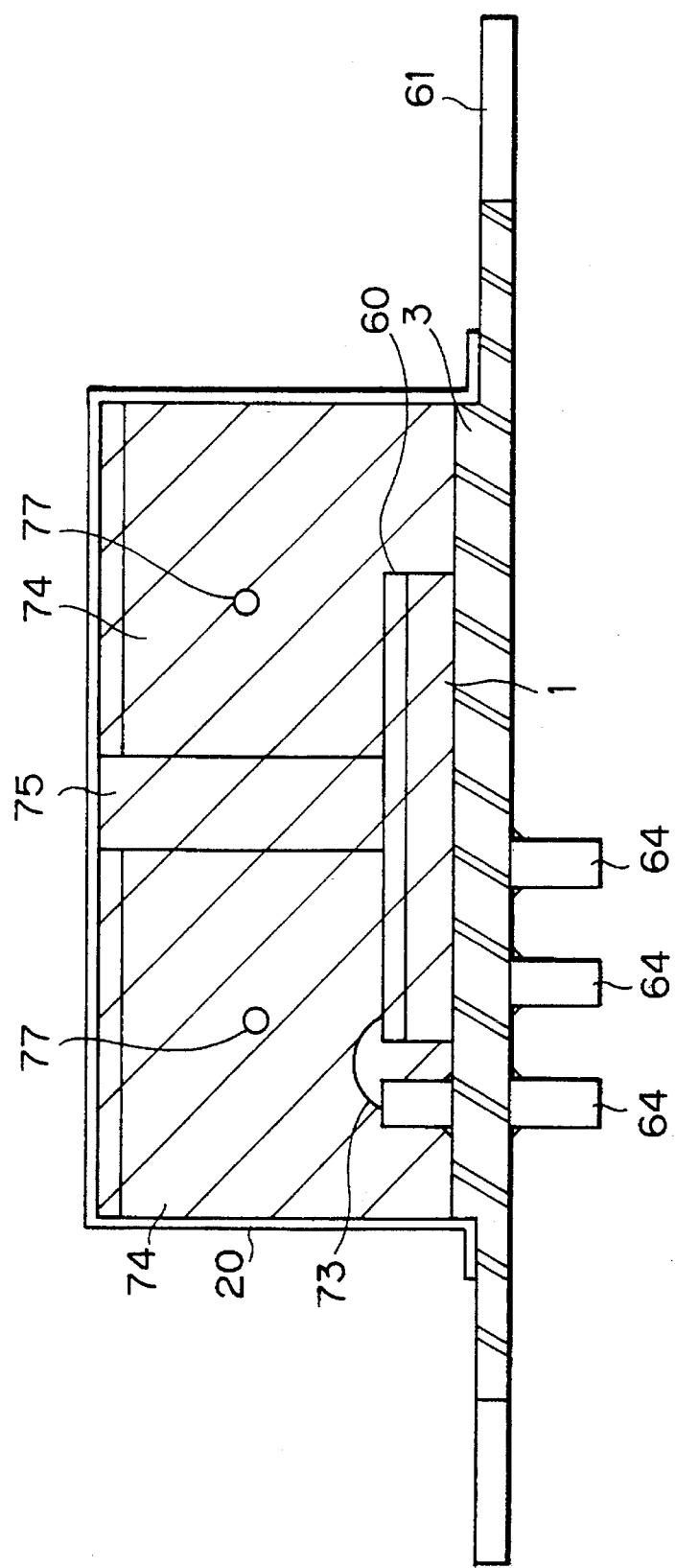
FIG. 15 is a sectional view along the line A—A of FIG. 14.

FIG. 14 is a diagram illustrating the whole constitution of the semiconductor acceleration sensor, and FIG. 15 is a sectional view along the line A—A of FIG. 14. This sensor is used for an ABS system of automobiles.

A stem 61 and a shell (covering member) 62 joined onto the upper surface thereof constitute a packaging member for holding a silicon chip 60 that will be mentioned later. The stem 61 is made of a metal such as Kovar and the shell 62 is made of a metal such as a steel or the like. The stem 61 has a protruded portion 63 formed at the central portion thereof, and four lead terminals 64 are secured to the protruded portion 63 by molten glass penetrating therethrough. In the outer periphery of the stem 61 are formed holes 65 for mounting the sensor.

Figure 16:
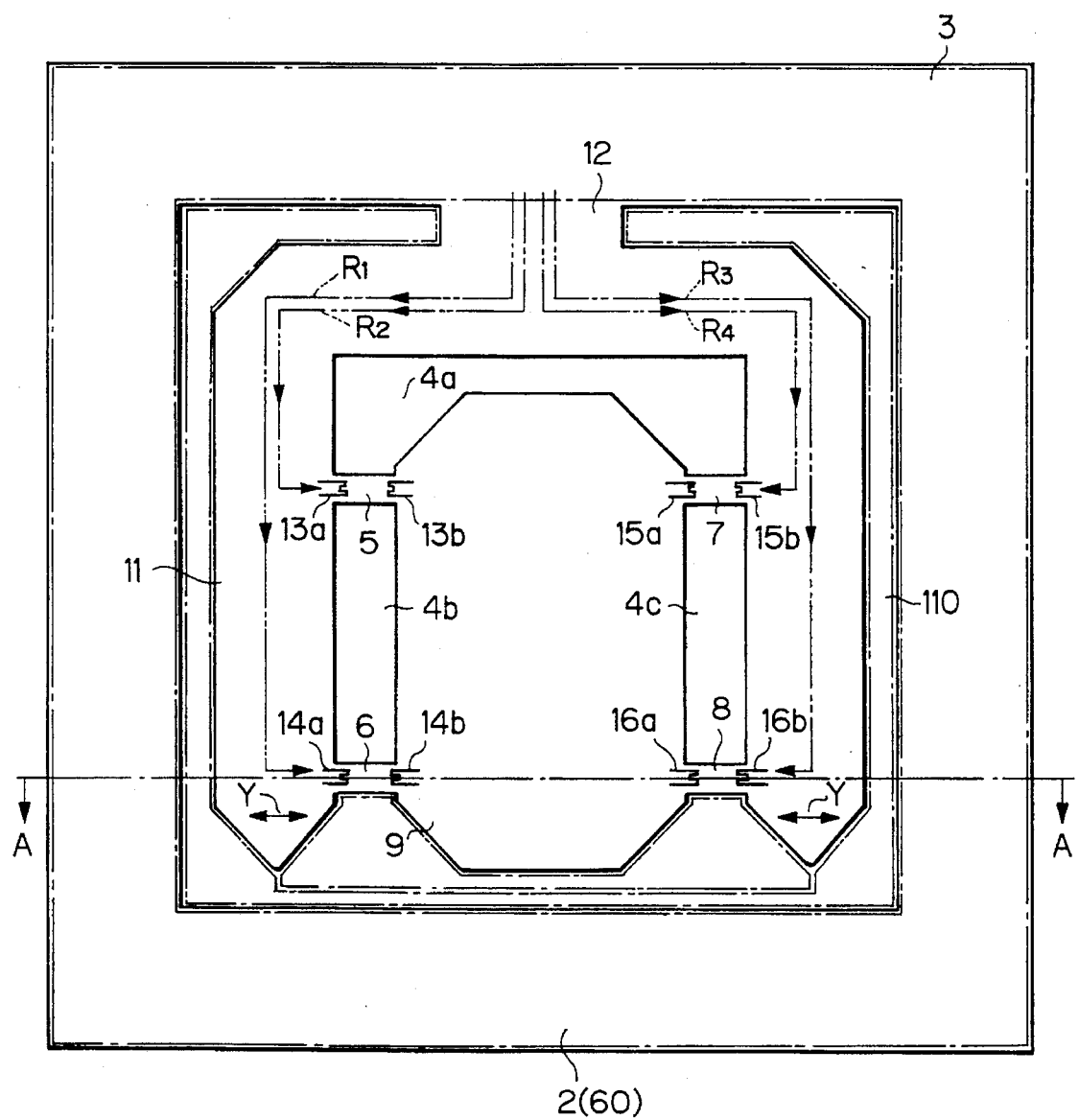
FIG. 16 is a plan view of a silicon chip.

A concrete example of the silicon chip 60 disposed in the package is shown in the perspective view of FIG. 1. FIG. 16 is a plan view of the silicon chip 60, and FIG. 2 is a sectional view along the line B—B of FIG. 16.

A seat 1 of the shape of a square plate composed of Pyrex glass is joined onto the protruded portion 63 of the stem 61, and a single crystalline silicon chip 2 of the shape of a square plate is disposed on the seat 1. The concrete structure of the silicon chip 60 was described above in detail in conjunction with FIG. 1, and is not described here again.

As shown in FIGS. 14 and 15, furthermore, two diaphragms are arranged over the silicon chip 60 in the shell 62 in such a manner so as to approach each other toward the upper side, and their ends form a communication hole 75 for a damping solution. The lower side of the diaphragms 74 is filled with the damping solution 76 such as silicone oil. A communication hole 77 for gas is formed in each of the diaphragms 74.

Described below is an embodiment of the method of producing a sensor. The description proceeds in conjunction with FIGS. 18 to 24.

Figure 18:
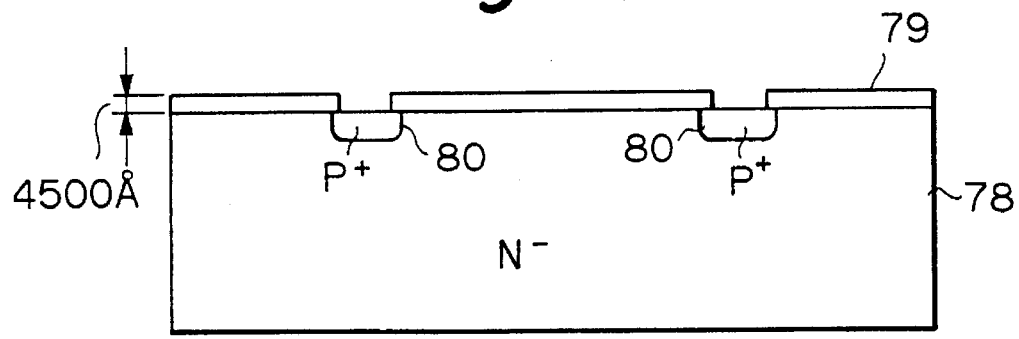
FIG. 18 is a sectional view illustrating a step of producing the sensor.
Figure 19:
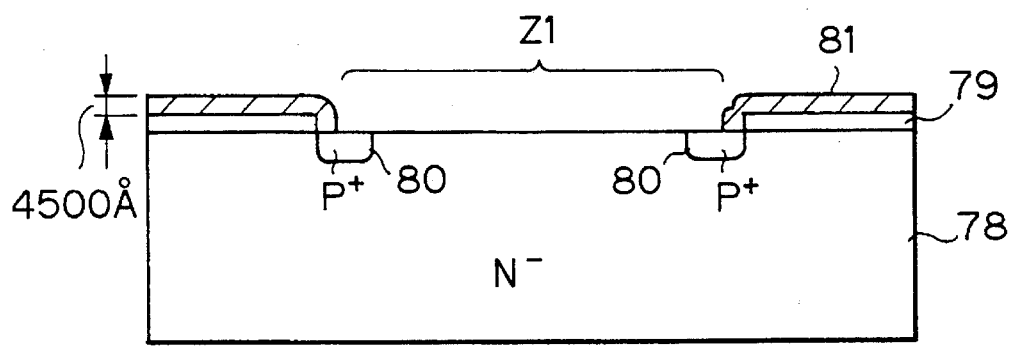
FIG. 19 is a sectional view illustrating a step of producing the sensor.

Referring, first, to FIG. 18, an $n^-$-type single crystalline silicon wafer 78 is prepared, and a silicon oxide film 79 is formed on the whole main surface thereof maintaining a thickness of 4500 Å. Then, a predetermined region of the silicon oxide film 79 is removed by etching, and a $p^+$-type diffusion layer 80 is formed on a predetermined region of the silicon wafer 78. Then, as shown in FIG. 19, a silicon oxide film 81 is formed on the whole surface of the silicon wafer 78 by CVD maintaining a thickness of 4000 Å. The silicon oxide films 79 and 81 are then removed by etching from the predetermined region Z1.

Figure 20:
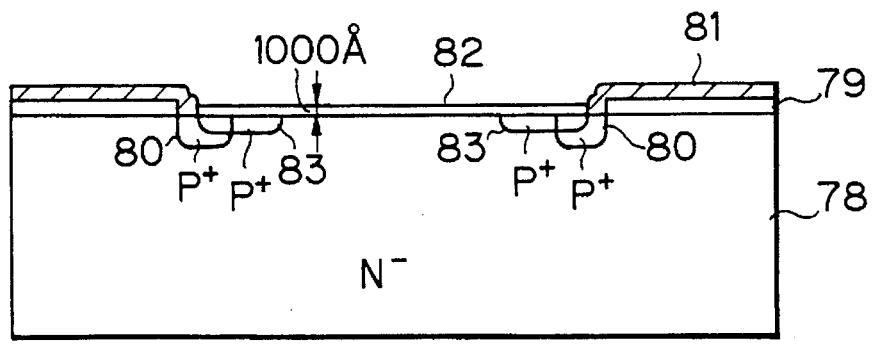
FIG. 20 is a sectional view illustrating a step of producing the sensor.

Then, as shown in FIG. 20, a silicon oxide film 82 is formed on the upper exposed portion of the silicon wafer 78 maintaining a thickness of 1000 Å. Thereafter, a mask of a predetermined pattern is arranged on the silicon oxide film 82, and then a $p^+$-type diffusion layer 83 that serves as a piezo-resistance layer is formed in the silicon wafer 78 by the injection of ions. The $p^+$-type diffusion layer 83 is connected to the $p^+$-type diffusion layer 80.

Figure 21:
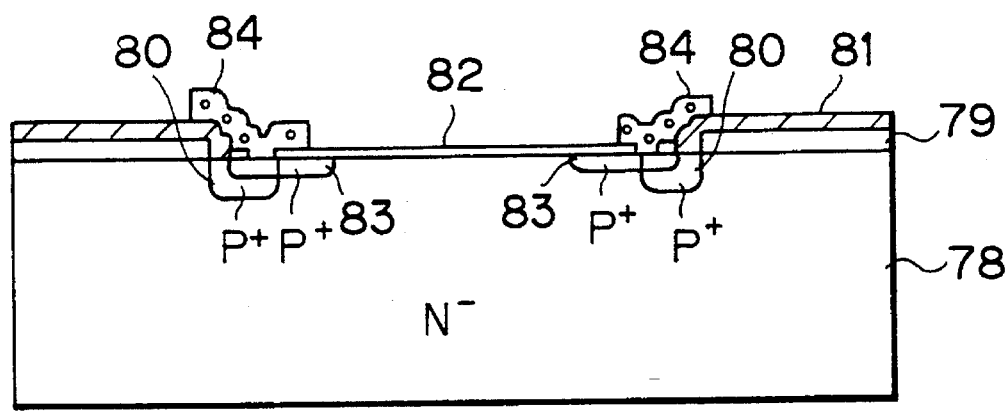
FIG. 21 is a sectional view illustrating a step of producing the sensor.

Then, as shown in FIG. 21, the contact portion of the silicon oxide film 82 is removed and the wiring is accomplished with aluminum 84.

Figure 22:
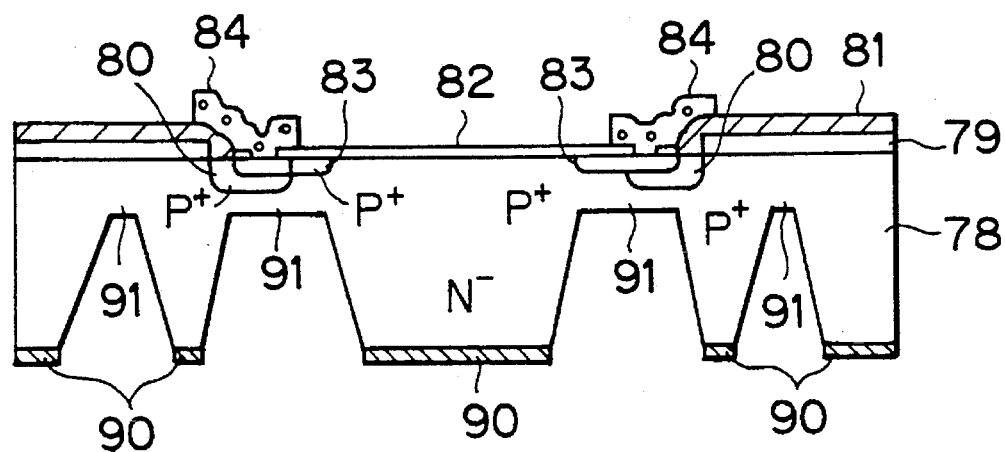
FIG. 22 is a sectional view illustrating a step of producing the sensor.

Referring next to FIG. 22, a silicon nitride film ($Si_3N_4$ film) 90 is patterned in a predetermined manner on the back surface of the silicon wafer 78. Under this condition, anisotropic etching is effected with a KOH solution in order to form a thin portion 91 having a p⁺-type diffusion layer 83 that serves as the piezo-resistance layer. Here, the thin portion 91 has a thickness of about 5m so that a predetermined sensitivity is obtained.

Figure 23:
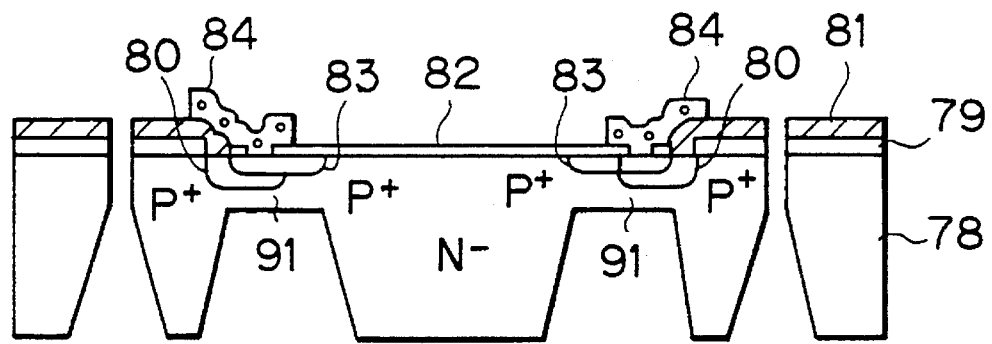
FIG. 23 is a sectional view illustrating a step of producing the sensor.

With reference next to FIG. 23, the thin portion 91 is dry-etched with the CF4 gas which is a halogen-type gas from the side of the main surface of the silicon wafer 78 in order to form beams (moving portions 5, 6, 7 and 8 in FIG. 16). That is, the surface of the silicon wafer 78 is etched to form grooves 10, 4a, 4b, 4c and 4d of FIG. 16 penetrating up and down.

Figure 24:
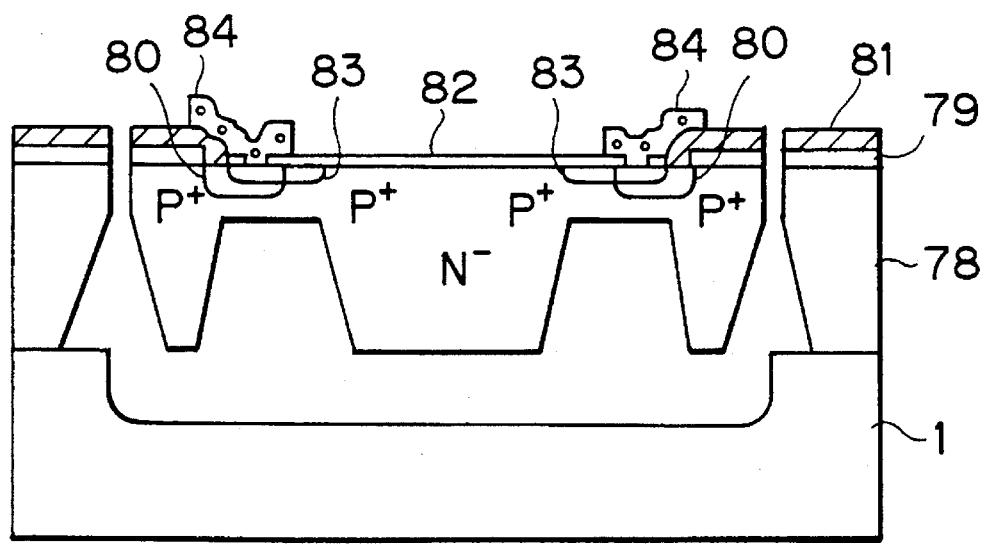
FIG. 24 is a sectional view illustrating a step of producing the sensor.

Referring next to FIG. 24, the silicon wafer 78 is anodically joined onto the seat 1 composed of Pyrex glass. Then, the silicon wafer 78 and the seat 1 are cut by dicing into a predetermined size as shown in FIG. 1.

Next, the seat 1 is adhered onto the protruded portion 63 of the stem 61, the shell 62 is joined onto the stem 61, and the damping solution 76 is filled therein.

In the thus produced semiconductor acceleration sensor as shown in FIG. 16, the second support portion 11, weight 9 and moving portions 5 to 8 are coupled, via the coupling portion 12 defined by the groove 10, to the first support portion 3 of the silicon chip 60 that is joined to the seat 1. Propagation paths R1, R2, R3 and R4 to the piezo-resistance layers are formed to propagate junction distortion of the first support portion 3 relative to the seat 1, the propagation paths being longer than when there is no groove 10. Therefore, the junction distortion (stress) generated by the first support portion 3 (junction portion) is transmitted from the coupling portion 12 to the second support portion 11, but is only slightly transmitted to the moving portions 5 to 8.

Moreover, a thin portion 91 is formed by removing by anisotropic etching a predetermined region of the silicon wafer 78 from the side of the back surface of the silicon wafer 78. The thin portion 91 is, then, partly removed from the side of the main surface of the silicon wafer 78 by dry etching using the CF₄ gas to form beams (moving portions 15, 16, 17 and 18 in FIG. 16). A variety of experiments were carried out to confirm the effects of beams formed by dry etching using the CF₄ gas. The results were as shown in FIGS. 25 and 26.

Figure 25:
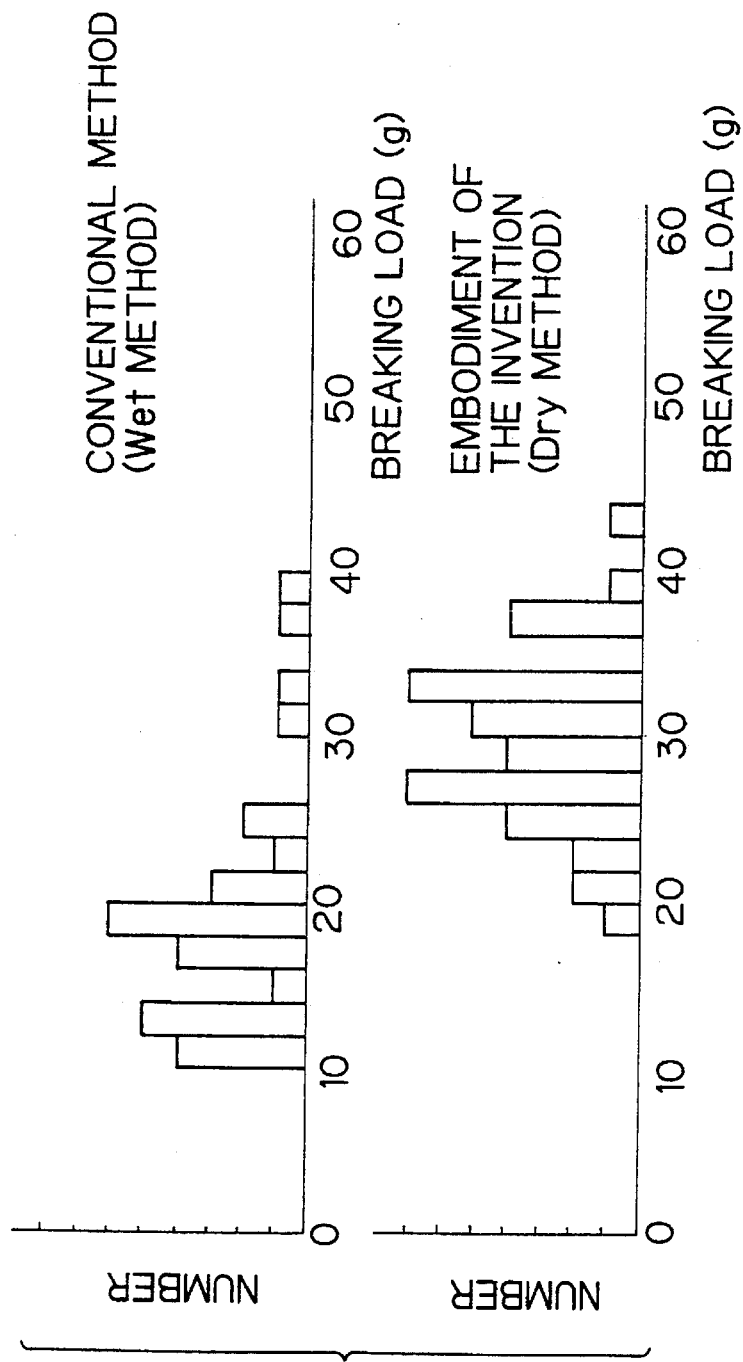
FIG. 25 is a histogram of breaking strengths of beams formed by wet etching and by dry etching.

FIG. 25 is a histogram representing breaking strengths of the beams formed by wet etching and dry etching. According to the conventional method based on wet etching as shown, the breaking load varies over a range of from 10 to 40 g. According to the embodiment of the invention based on dry etching, on the other hand, the breaking load varies over a range of from 18 to 44 g. Thus, the minimum breaking load can be shifted from 10 g to 18 g by the employment of dry etching.

The cause of an increase in the breaking load is presumed to stem from the shape of side surfaces of the beam. That is, according to the conventional method based on wet etching, the side surfaces of the beam are swollen as shown in FIG. 28, the amount of swelling being 15 to 30 μm. According to the embodiment of the present invention based on dry etching as shown in FIG. 27, on the other hand, the amount of swelling on the side surfaces of the beam is smaller than 5m. FIGS. 27 and 28 illustrate the results of observation using an SEM.

Figure 26:
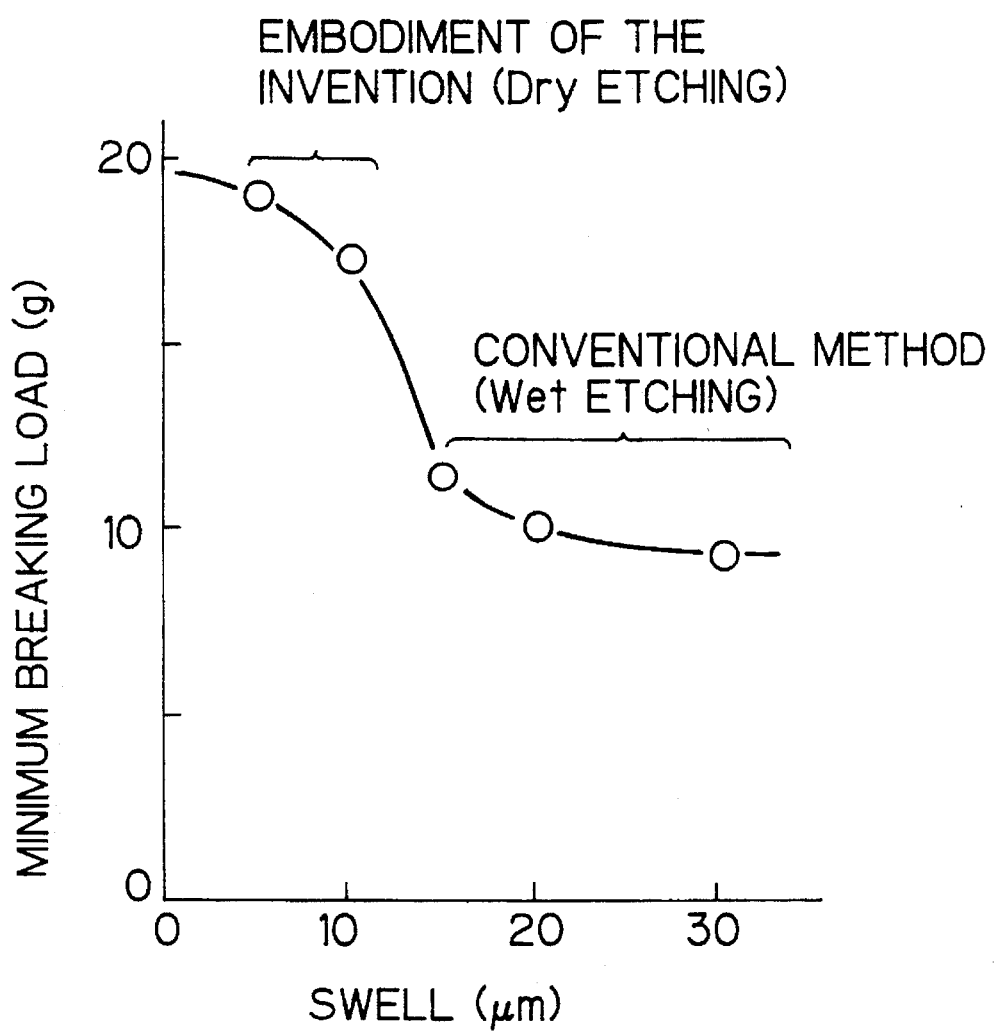
FIG. 26 is a diagram illustrating a relationship between the swell and minimum values of the breaking load.

FIG. 26 illustrates the relationship between the swelling of the side surfaces of the beam and the breaking strength (minimum breaking load) of the beam, from which it will be understood that the breaking strength can be increased if the swelling is suppressed to be smaller than 15 μm. Dry etching is employed to decrease the swelling.

With the dry etching that is put into practical use at present, silicon can be etched to a depth of up to 10 μm and, hence, the beam can be used up to a thickness of 10 μm.

Under the condition where the semiconductor acceleration sensor is incorporated in an ABS system of automobiles, the voltage across the output terminals 33 and 34 of the bridge circuit of FIG. 3 is taken in by a controller for the ABS system. The controller for the ABS system detects the acceleration of the vehicle relying upon a voltage, calculates the deceleration of the vehicle to determine the μ-state of the load surface, forms a false vehicle speed adapted thereto, and brings it close to the vehicle speed to optimize the slipping factor of the wheels.

The present invention is in no way limited to the above-mentioned embodiments only. In the above-mentioned embodiments, for instance, the beam was formed by dry etching using CF₄ gas. However, the etching gases of other halogen types such as SF₆ and the like, can be used.

According to another method of production, furthermore, an epitaxial layer (3 to 5 μm in thickness) having a second type of electric conduction is formed on the main front surface of the single crystalline silicon substrate having a first type of electric conduction, a predetermined region of the single crystalline silicon substrate is removed by electrochemical etching leaving the epitaxial layer which forms a thin portion, and the thin portion is partly removed from the side of the main front surface of the single crystalline silicon substrate by dry etching using CF₄ (halogen-type gas) to form a beam.

According to the present invention as described above in detail, even a thin beam exhibits sufficiently large strength.

We claim:

1. A method of producing a semiconductor dynamic sensor comprising steps of:

coating a front main surface of a semiconductor substrate with a first resist film;

patterning said first resist film to expose a first region of said front main surface where upper isolation grooves are formed;

forming a lower isolation groove under said first region of said front main surface of said semiconductor substrate and under a second region of said semiconductor substrate where thin distortion-producing portions are formed, after said first resist film is patterned, by firstly etching a region of a back main surface of said semiconductor substrate; and forming said upper isolation grooves to connect to said lower isolation groove by secondly etching said exposed first region of said front main surface of said semiconductor substrate utilizing said patterned first resist film, in order to sectionalize said thin distortion-producing portions in said second region of said semiconductor substrate where said thin distortion-producing portions are formed, said thin distortion-producing portions being formed by utilizing said lower isolation groove.

2. A method of producing a semiconductor dynamic sensor according to claim 1, comprising a further step of providing an n⁺-type diffusion layer in said first region of said semiconductor substrate.

3. A method of producing a semiconductor dynamic sensor according to claim 1, comprising a further step of forming a piezo-resistance region with a p⁺-type diffusion layer on said front main surface of said semiconductor substrate.

4. A method of producing a semiconductor dynamic sensor according to claim 1, comprising a further step of providing said semiconductor substrate composed of single crystalline silicon.

5. A method of producing a semiconductor dynamic sensor according to claim 1, wherein said first resist film is composed of a polyimide-type resin material.

6. A method of producing a semiconductor dynamic sensor according to claim 2, comprising a further step of connecting an electrode to said $n^+$-type diffusion layer in said front main surface of said semiconductor substrate.

7. A method of producing a semiconductor dynamic sensor according to claim 1, comprising a further step of forming a second resist film of a plasma nitride film on said back main surface of said semiconductor substrate to expose a portion of said back main surface of said semiconductor substrate that corresponds to said region of said back main surface of said semiconductor substrate where said lower isolation groove is to be formed.

8. A method of producing a semiconductor dynamic sensor according to claim 6, wherein said step of forming said lower isolation groove includes steps of:

applying a wax onto said first resist film on said front main surface of said semiconductor substrate;

immersing said semiconductor substrate in an etching solution; and executing electrochemical etching by supplying an electric current to said electrode.

9. A method of producing a semiconductor dynamic sensor according to claim 1, further comprising, between said step of forming said lower isolation groove and said step of forming said upper isolation grooves, a step of applying a second resist onto all of said back main surface of said semiconductor substrate.

10. A method of producing a semiconductor dynamic sensor according to claim 9, comprising a further step of removing said second resist from said back main surface of said semiconductor substrate following said step of forming said upper isolation grooves.

11. A method of producing a semiconductor dynamic sensor according to claim 1, wherein said etching in said step of forming said upper isolation grooves is dry etching.

12. A method of producing a semiconductor dynamic sensor according to claim 11, wherein said dry etching uses a halogen-type gas.

13. A method of producing a semiconductor dynamic sensor according to claim 12, wherein said halogen-type gas is $CF_4$.

14. A method of producing a semiconductor dynamic sensor according to claim 1, further comprising steps of:

forming a piezo-resistance layer before said first resist film is coated, said piezo-resistance layer detecting distortion in said first region of said front main surface of said semiconductor substrate, said piezo-resistance layer serving as a connecting portion between said first region of said front main surface of said semiconductor substrate and said Second region of said front main surface of said semiconductor substrate;

forming a thin portion in said semiconductor substrate whereon said piezo-resistance layer is formed by performing said step of firstly etching by anisotropic etching from said back main surface of said semiconductor substrate; and forming a beam by performing said step of second etching by dry etching using a halogen-type gas.

* * * * *